May 2, 1961 W. B. CAGLE 2,982,869

SEMICONDUCTOR TRIGGER CIRCUIT

Filed Feb. 25, 1959

INVENTOR
W. B. CAGLE
BY

ATTORNEY 2,982,869

SEMICONDUCTOR TRIGGER CIRCUIT

William B. Cagle, Madison, N.J., assignor to Bell Telephone Laboratories, Incorporated, New York, N.Y., a corporation of New York Filed Feb. 25, 1959, Ser. No. 795,519

18 Claims. (Cl. 307—88.5)

This invention relates to semiconductor signal translating devices and more particularly to bistable trigger circuits including semiconductor devices.

A bistable multivibrator or flip-flop circuit has two stable states which are manifested by an output of two distinct voltage levels. Such circuits find application in switching networks, counting circuits, shift registers and the like. A bistable multivibrator, as known in the art, is a circuit which can be triggered from one stable state to the other by the application of triggering pulses.

It is desirable that circuits of this type be reliable, of relatively simple and compact construction, and have rapid response to triggering pulses. Bistable multivibrators which achieve these objectives have been constructed, utilizing two semiconductor devices or transistors cross-coupled through resistance-capacitance networks and suitably biased such that when one device is in a state of high conduction, the other is maintained in a state of zero of low conduction.

The manner in which the triggering pulses are directed or steered to the transistors may take one of two forms. Thus in one instance, in accordance with the well known Eccles-Jordan circuit operation, the triggering pulse is directed to the proper input by means of gates, the steering action of which is controlled solely by the conduction state of the flip-flop elements. Such steering action, referred to as unconditional steering, requires that the triggering pulse be of less duration than the delay in the feedback control paths of the steering gates so as to prevent oscillation and consequent unreliable operation. In order to assure conformance to this requirement, differentiated inputs and lumped delay elements are variously employed.

A more reliable operation has been realized by the adoption of conditional steering, whereby actuation of the steering gates is conditioned upon a change of the flip-flop states and removal of the triggering pulse. In this instance the triggering pulse may be of any length without consequent oscillation in the flip-flop operation, thus obviating the need for input wave form and delay control circuitry. Although conditional steering provides a more reliable flip-flop operation, the resulting circuits have been considerably more complex than those employing unconditional steering.

It is an object of this invention to provide a reliable and economic bistable multivibrator.

It is another object of this invention to provide an improved bistable multivibrator which employs conditional steering.

It is a further object of this invention to provide a reliable transistor multivibrator circuit utilizing conditional steering and requiring relatively few components.

These and other objects are attained in accordance with illustrative embodiments of my invention by the provision of a bistable multivibrator circuit comprising two transistors coupled to a plurality of diodes and storage devices forming logic gates for steering triggering pulses to the transistors. Each transistor comprises an emitter, collector and base electrode and has its emitter electrode connected to ground. The base electrode of each transistor is coupled through the corresponding steering gate to the triggering pulse source over a path including a storage device and a diode. Also the base electrode of each transistor is coupled through the corresponding steering gate to the collector electrode of the other transistor over a path including a pair of oppositely poled diodes. A bias source is connected through a resistance to the connection between each pair of diodes in the cross-coupling paths and between each diode and storage device in the triggering input paths.

The circuit is arranged such that a current path shunting the transistor base electrodes is established on a selective basis to control switching of the transistors between conductive and nonconductive states. Such selection is obtained by utilizing the triggering pulse and the change of state of the transistors to reverse-bias various of the diodes. Thus, upon application of a triggering pulse, the bistable multivibrator is prepared or placed in a condition to change its state. Upon removal of the triggering pulse the actual change of state occurs. In this manner, the possibility of the triggering pulse causing oscillation in the multivibrator due to its application for a period greater than the period for switching between stable states is eliminated. This desirable result is achieved, in accordance with my invention, by a circuit comprising the flip-flop transistors and steering gates, the latter comprising a plurality of diodes, storage devices and bias sources.

In accordance with one aspect of my invention, the storage devices, which serve to initiate the change of state in the transistors, may each comprise a slow reverse recovery diode connected so as to utilize its reverse, transient current characteristic. This characteristic of semiconductor devices is recognized and discussed, for example, in M. E. McMahon Patent 2,737,601, issued March 6, 1956.

In brief, certain physical phenomena occurring within the semiconductor diode, which has been conducting and is abruptly back-biased, will produce a momentary surge of reverse current before the usual rectifying barrier is established. This surge of reverse current advantageously is of sufficient duration to change the state of operation of the flip-flop transistor coupled to the diode. Such slow reverse recovery diodes are referred to hereinafter as "slow diodes" in contrast to the balance of the diodes in the steering circuitry which exhibit a minimum reverse recovery characteristic and are thus referred to hereinafter as "fast" diodes.

Further in accordance with this aspect of my invention, the maximum switching frequency of the multivibrator is determined in part by the reverse recovery time of the slow diode. Thus the period of the triggering pulse must be long enough to allow the slow diodes to complete their reverse recovery between transitions of the flip-flop. Such reverse recovery may be accelerated by shunting the resistance across which the transistor control voltage level is established with a diode poled in opposition to the slow diode.

It is a feature of this invention that a pair of transistors in a bistable multivibrator circuit are coupled to each other and to a triggering pulse source through a conditional steering circuit comprising a plurality of diodes and storage devices.

It is another feature of this invention that various bias voltages be applied intermediate the pairs of diodes and the interconnected diodes and storage devices in the conditional steering circuitry.

It is a specific feature of this invention that the storage devices in the conditional steering circuitry comprise slow reverse recovery diodes.

It is another more specific feature of this invention that a reverse recovery current path for each slow diode be provided to ground through a diode poled in opposition to the corresponding slow diode.

It is a feature in accordance with one embodiment of this invention that a storage device be direct-current coupled to the base of one transistor and in common through steering circuit diodes to the triggering pulse source and to the collector of the other transistor.

It is a feature in accordance with another embodiment of this invention that the base electrode of each transistor be coupled to the collector electrode in the same transistor through a pair of diodes and that the storage device in the triggering input path be connected to a point intermediate said two diodes.

A complete understanding of this invention, together with the above-noted and other features thereof, may be gained from consideration of the following description and accompanying drawing, in which.

Figure 1:
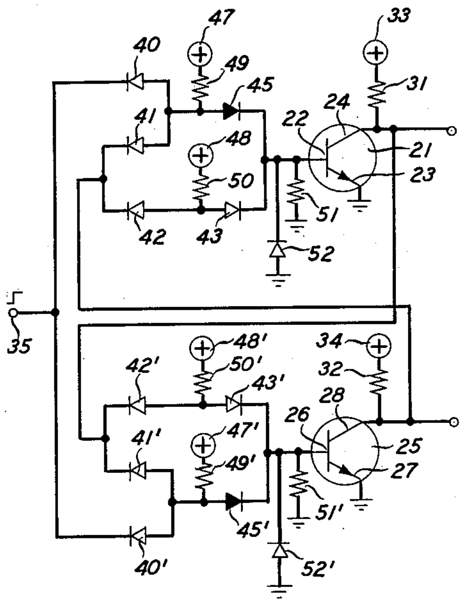
Fig. 1 is a schematic representation of a bistable multivibrator illustrative of one specific embodiment of the invention.

Referring now to the drawing, the specific embodiment of a bistable multivibrator circuit illustrated in Fig. 1 comprises a transistor 21 including a base electrode 22, an emitter electrode 23 and a collector electrode 24, and a transistor 25 including a base electrode 26, an emitter electrode 27 and a collector electrode 28. These transistors advantageously may be of the alloy junction type such as are known in the art and are illustrated as having NPN connections, although PNP transistors will serve equally well with appropriate changes in the circuit biases and component polarities.

As illustrated, the collector electrodes 24 and 28 of transistors 21 and 25 are connected through current-limiting resistors 31 and 32, respectively, to sources of operating potential 33 and 34. The emitter electrodes 23 and 27 of the transistors are each connected to ground. The base electrode of each transistor is coupled through a steering circuit to the collector electrode of the other transistor and to a triggering pulse source 35.

In accordance with this embodiment of the invention, the steering circuit comprises two sections, one section associated with each of the flip-flop transistors. Specifically, that section of the steering circuit associated with transistor 21 comprises four diodes, 40, 41, 42 and 43 connected in series between the triggering pulse input lead 35 and the base electrode of transistor 21, adjacent diodes being connected in polarity opposition. A storage device, such as 45, is connected from the base electrode 22 of transistor 21 to the circuit intermediate diodes 40 and 41. The cross-coupling path to the collector electrode of transistor 25 includes lead 46 emanating from a connection intermediate diodes 41 and 42. Appropriate bias sources 47 and 48 complete this section of the steering circuit. Source 47 is connected through resistor 49 to the circuit intermediate diode 40 and storage device 45, and source 48 is connected through resistor 50 to the circuit intermediate diodes 42 and 43.

That section of the steering circuit associated with transistor 25 is equivalent to the section just described, and thus the elements thereof are identified by the corresponding numbers primed. Resistors 51 and 51′ connected between ground and the base electrodes of transistors 21 and 25, respectively, serve to establish the proper bias for control of the transistors.

In the operation of this embodiment of the invention, assuming that the triggering pulse applied on input lead 35 is a square wave and is initially at its low voltage level, the biases applied by sources 47 and 47′ are such that the diodes 40 and 40′ are conducting current through resistors 49 and 49′, respectively. Assuming, further, that the stable state of the flip-flop circuit is such that transistor 21 is conducting and transistor 25 is nonconducting, the diodes 41′ and 42′ will be conducting current through resistors 49′ and 50′, respectively. Diodes 41 and 42, however, will be back-biased by the voltage at source 34 connected to the collector 28 of the nonconducting transistor 25.

When the triggering pulse shifts to its high voltage level, diodes 41 and 42 remain nonconductive such that the current through resistor 50 and diode 43 maintains the conductivity of transistor 21. The current through resistors 49′ and 50′ will continue to flow through diodes 41′ and 42′, respectively, so that transistor 25 remains nonconductive. Thus the only effect of the shift in level of the triggering pulse is to back-bias diodes 40 and 40′ and thereby to activate the storage device 45.

When the triggering pulse reverts to its low level, current again flows through diodes 40 and 40′, and transistor 21 is rendered nonconductive by the action of the activated storage device 45. With transistor 21 nonconductive, the potential of source 33 serves to back-bias diodes 41′ and 42′, thereby causing the current through resistor 50′ to be switched to the base of transistor 25 through diode 43′. The consequent change in the voltage level at the base electrode 26 of transistor 25 will render it conductive, which in turn will remove the back-bias from diodes 41 and 42 and permit them to conduct current from sources 47 and 48, respectively.

The flip-flop has now completed a reversal of its stable state, with transistor 21 nonconductive, transistor 25 conductive and the triggering pulse at its low level. In order to complete the cycle of operation and restore the original stated condition of the flip-flop, the triggering pulse must again rise to its high level and return to its low level. In this instance the rise in voltage of the triggering pulse back-biases diode 40′ and causes bias source 47′ to be applied to the storage device 45′. Thus the storage device 45′ is activated or placed in a proper condition for rendering transistor 25 nonconductive when the triggering pulse again reverts to its low level.

When the triggering pulse reverts to its low level, current from source 47′ once again is directed through diode 40′ and the activated storage device 45′ renders transistor 25 nonconductive. With transistor 25 nonconductive, diodes 41 and 42 are back-biased by the source 34 at the collector of transistor 25, and current again flows from source 48 through resistor 50 and diode 43 to alter the potential at the base of transistor 21 in a manner serving to render transistor 21 conductive. Thus the original stable state is exhibited by the flip-flop circuit with the triggering pulse again at its low level.

It is seen therefore that each change in the triggering pulse from a low to a high level prepares or conditions the flip-flop for a change in its stable state but cannot itself produce such a change. It remains for the change in the triggering pulse from a high to a low level to effect the transition to the opposite stable state of the flip-flop circuit.

Figure 2:
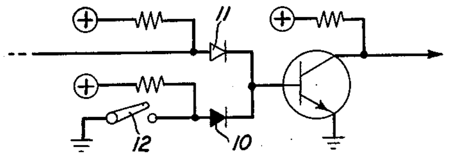
Fig. 2 is a circuit illustrative of the operation of selected logic elements in conjunction with a slow diode.

The storage devices 45 and 45′ in the circuit of Fig. 2 may comprise capacitors. However, such a capacitive coupling would shunt the base of each transistor and consequently slow down the flip-flop operation. Such a coupling also may result in difficulty due to false triggering from spurious noise signals. Advantageously, in accordance with one aspect of my invention, slow reverse recovery diodes are employed as the storage devices 45 and 45′. As noted hereinbefore, these diodes exhibit a reverse current flow immediately prior to establishment of the rectifying barrier upon application of a reverse bias to the diode.

This effect is illustrated by the circuit of Fig. 2 in which diode 10 is a slow reverse recovery diode or merely a slow diode and diode 11 is a fast reverse recovery diode or fast diode. Each of the diodes 10 and 11, as shown, conduct current through the base-emitter junction of the conducting transistor. Closure of the switch 12, serves to back-bias the slow diode 10. However, the resultant characteristic reverse current flow through the diode 10, immediately upon closure of the switch 12, serves to render the transistor nonconductive, in which condition it will remain until the diode 10 has assumed its high impedance state.

This reverse recovery characteristic of semi-conductor diodes has proven to be a serious limitation on the operation of various diode logic control circuitry known in the art. However, this principle has been turned to advantage in the bistable multivibrator circuit of my invention. Thus in the embodiment of Fig. 1, with the triggering pulse at its high level and diodes 40 and 40′ back-biased, current is directed through the slow diode 45 or 45′ connected to the conducting transistor, serving to drive that transistor further into saturation. When the triggering pulse reverts to its low level, the reverse current flow through the priorly conducting slow diode 45 or 45′ will serve to render the associated transistor nonconductive. The time required for the slow diode to recover to its high impedance state is sufficient to permit a reversal of the stable state of the flip-flop. The transistors are then maintained in the new stable state by current flow through the appropriate fast diode 43 or 43′.

Advantageously, the reverse recovery current is directed through low impedance paths including diodes 52 and 52′, shunting resistors 51 and 51′, respectively, as illustrated in Fig. 1. Such action, as indicated hereinbefore, serves to accelerate recovery of the associated slow diodes 45 and 45′, thereby permitting a decrease in the period of the triggering pulses and a consequent further increase in speed of operation of the multivibrator.

Figure 3:
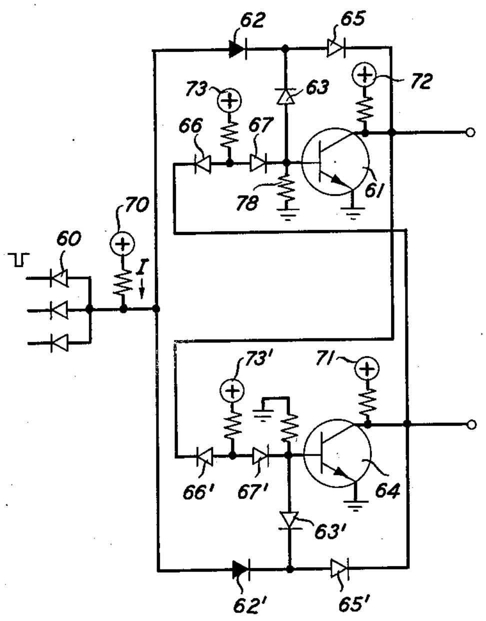
Fig. 3 is a schematic representation of a bistable multivibrator illustrative of another specific embodiment of the invention.

The embodiment of my invention depicted in Fig. 3 includes the same basic flip-flop as in the circuit of Fig. 1. The steering circuit is modified such that the triggering pulse is applied through fast diode 60 to the base of transistor 61 through slow diode 62 and fast diode 63, and to the base of transistor 64 through slow diode 62′ and fast diode 63′. In addition, a connection is established from the base to the collector of each transistor 61 and 64 through diodes 65 and 65′, respectively. As in the circuit of Fig. 1, the cross-coupling paths include diode pairs 66, 67 and 66′, 67′, and appropriate bias sources are provided in the steering circuitry to permit the desired logic operations.

Advantageously, in accordance with this embodiment of the invention, plural triggering pulse sources may be provided, each applying triggering pulses through a distinct diode such as diode 60. Plural diodes such as 60 thus form a coincidence logic circuit such that when all triggering pulses are at a high level, current will flow through slow diodes 62 or 62′ from source 70, dependent upon which of the transistors 61 and 64 is currently conducting.

Considering, for example, that the stable state of the flip-flop is such that transistor 61 is conducting and transistor 64 is nonconducting, current will be flowing through slow diode 62 and fast diode 65, while the source 71, at the collector of nonconducting transistor 64, will serve to back-bias slow diode 62′ and fast diode 65′. When one or more of the triggering pulses reverts to its low level, current flow from the source 70 will be diverted through the corresponding input diode, such as diode 60, serving to back-bias slow diode 62. The slow diode 62 will exhibit a reverse current flow prior to achieving its high impedance state, such flow being directed from the base of transistor 61 through diode 63, thereby serving to render transistor 61 nonconductive.

With turn-off of transistor 61, the potential of source 72 serves to back-bias diodes 65 and 66′ and initiate current flow through diode 67′ from source 73′. Such current flow serves to raise the voltage level above ground at the base of transistor 64, thereby rendering it conductive. Turn-on of transistor 64 similarly serves to direct current flow from source 73 through diode 66, thereby back-biasing diode 67 so as to place the base electrode of transistor 61 at ground upon recovery of slow diode 62 to its high impedance state.

In similar fashion, upon the return of the triggering pulses to the high level and thereafter the excursion of one or more of the triggering pulses from the high level to the low level, the flip-flop circuit will revert to its original stable state.

It will be appreciated by those skilled in the art that the flip-flop circuit in each of the embodiments illustrated in Figs. 1 and 3 may be utilized in multiple stage counters by simply cascading the illustrated stages and driving the input to each stage from the output pulse derived from one output of the preceding stage. Provision for presetting the various stages of such a counter may be provided in the circuit of Fig. 1, for example, by applying appropriate preset pulses to diodes connected to points intermediate the diodes 42 and 43 and the diodes 42′ and 43′. Multiple triggering may also be realized in the circuit of Fig. 1 by provision of additional input circuits in parallel with the input circuit including lead 35 and diodes 40 and 40′.

The flip-flop circuit in accordance with my invention may also be employed as a stage of a shift register simply by the connection in the circuit of Fig. 1, for example, of the outputs of the preceding stage through diodes to a point intermediate diodes 40 and 45 and a point intermediate diodes 40′ and 45′, respectively.

It is to be understood that the above-described arrangements are merely illustrative of the application of the principles of the invention. Numerous other arrangements may be devised by those skilled in the art without departing from the spirit and scope of the invention.

What is claimed is:

1. A multivibrator circuit comprising a pair of transistors having base, emitter and collector electrodes and having the emitter electrodes connected to ground, trigger pulse applying means, first means for coupling said pulse applying means to each of said transistors, each of said first coupling means comprising a first diode and storage means connected in series between said pulse applying means and the base electrode of the associated transistor, first biasing means connected to said first coupling means between the first diode and storage means, a first pair of diodes connected in series opposition between the base of one transistor and the collector of the other transistor, a second pair of diodes connected in series opposition between the base of said other transistor and the collector of said one transistor, and second biasing means connected to the cross-coupling paths between the diodes in each of said first and second pairs of diodes.

2. A multivibrator circuit comprising a pair of transistors, each transistor including a base, an emitter and a collector electrode, trigger pulse applying means, first means defining distinct paths between said pulse applying means and the base electrode of each transistor and including first diode means and storage means connected in series in each distinct path, means connecting a first voltage source to each of said paths between said first diode means and said storage means, means defining cross-coupling paths between the base of each transistor and the collector of the other transistor and including a pair of diodes connected in series opposition in each cross-coupling path, and means connecting a second voltage source to each of said cross-coupling paths intermediate said pair of diodes.

3. A multivibrator circuit in accordance with claim 2 wherein said storage means comprises diode means exhibiting a slow reverse recovery characteristic.

4. A multivibrator circuit in accordance with claim 2 and further comprising diode means connected between the collector of each transistor and said first voltage source connecting means associated with the other transistor.

5. A multivibrator circuit in accordance with claim 2 wherein said first means further comprises second diode means connected between said storage means and the base electrode of each of said transistors.

6. A multivibrator circuit in accordance with claim 5 and further comprising third diode means connected between said first means associated with one transistor and the collector electrode of said associated transistor.

7. A multivibrator circuit in accordance with claim 2 and further comprising means including resistance means connecting said base electrodes to ground.

8. A multivibrator circuit in accordance with claim 7 wherein said means connecting said base electrodes to ground further comprises diode means in parallel with said resistance means.

9. A bistable multivibrator comprising a pair of transistors each including a base, an emitter and a collector electrode, trigger pulse applying means, first, second and third voltage sources, storage means, means connecting said storage means to the base of each transistor, first diode means connected between said storage means and said pulse applying means, first means connecting said first voltage source to the first diode side of said storage means in forward-bias relation to said first diode means, a pair of oppositely poled diodes in each cross-coupling path between the base of one transistor and the collector of the other transistor, second means connecting said second voltage source to the cross-coupling paths in forward-biasing relation to each diode in said pairs of diodes, means connecting said third voltage source to the collector electrode of each of said transistors, and means connecting the base electrode of each of said transistors to ground.

10. A bistable multivibrator comprising a pair of transistors each including an emitter electrode, a base electrode and a collector electrode, first means comprising diode means and storage means connected to each transistor, means for applying a trigger pulse having two distinct voltage levels to said first means connected to at least one of said transistors, means connecting a second voltage source to said first means between said diode means and said storage means, means connected in cross-coupling paths between the base of each transistor and the collector of the other transistor, said means comprising a pair of oppositely poled diodes in each cross-coupling path and means connecting a third voltage source to each cross-coupling path between the diodes of said pairs of diodes.

11. A bistable multivibrator comprising a pair of transistors, each transistor including a base, an emitter and a collector electrode, said emitter electrode being connected to ground, means connecting said base electrode to ground and means connecting said collector electrode to a first potential source, trigger pulse applying means, means including storage means coupled between said pulse source and the base electrode of each transistor, means for connecting a second potential source to said coupling means on the side of said storage means remote from said base electrode, said coupling means further comprising first diode means connected between said pulse applying means and said storage means for isolating said second potential source from said pulse applying means with the trigger pulse at one voltage level and for connecting the second potential source to the pulse applying means with the trigger pulse at a second voltage level, means coupling the base electrode of one transistor to the collector electrode of the other transistor and including in each cross-coupling path a pair of diodes connected in series opposition, and a third potential source coupled to said cross-coupling means intermediate each of said pairs of diodes.

12. A multivibrator circuit comprising a pair of transistors, each including a base, an emitter and a collector electrode, means connecting the base electrodes to ground, trigger pulse applying means and a conditional steering circuit having like sections associated with each transistor, each of said steering circuit sections comprising a first diode having a slow reverse recovery characteristic connected to the base electrode of the associated transistor, a second diode connected between said pulse applying means and said first diode in at least one of said steering circuit sections and poled in opposition to said first diode, a third diode connected between the common connection of said first and second diodes and the collector electrode of the other transistor and poled in opposition to said first and second diodes, means connecting like conductivity type electrodes of said first, second and third diodes to a second voltage source, a pair of diodes connected in series opposition between the base electrode of the associated transistor and the collector electrode of the other transistor, and means connecting like conductivity type electrodes of said pair of diodes to a third voltage source.

13. A multivibrator circuit in accordance with claim 12 wherein said transistor base electrode and that portion of said first diode connected to said transistor base electrode are of opposite conductivity type semi-conductor material.

14. A bistable multivibrator comprising a pair of transistors, each transistor including a base, an emitter and a collector electrode, means connecting the base electrode of each transistor to ground, trigger pulse applying means and a conditional steering circuit having like sections associated with each transistor, each of said steering circuit sections comprising a first pair of like poled diodes connecting the base and collector electrodes of the associated transistor, a second pair of oppositely poled diodes connecting the base of the associated transistor to the collector of the other transistor, means connecting like conductivity type electrodes of said second pair of diodes to a second voltage source, a third pair of oppositely poled diodes connecting said pulse applying means to a point between said first pair of diodes, one of said third pair of diodes having a slow reverse recovery characteristic, and means connecting like conductivity type electrodes of said third pair of diodes to a third voltage source.

15. A multivibrator circuit comprising a pair of transistors each having a base, emitter, and collector electrode, means connecting said emitter electrodes to ground, diode logic means connecting the collector electrode of each of said transistors to the base electrode of the other of said transistors, trigger pulse applying means, and means for connecting said trigger pulse applying means to at least one of said base electrodes, said last-mentioned means including a fast and a slow recovery diode in series opposition between said trigger means and said base electrode.

16. A multivibrator circuit in accordance with claim 15 wherein said fast recovery diode is connected to said trigger means and further including bias means connected to the point of connection between said fast and slow recovery diodes.

17. A multivibrator circuit in accordance with claim 15 and further including diode means connected between said slow recovery diode and said base electrode, and between said slow recovery diode and said collector electrode.

18. A multivibrator circuit in accordance with claim 15 wherein said diode logic means includes a pair of oppositely poled diodes connected between the base electrode of each transistor and the collector electrode of the other of said transistors and further including bias means connected to the point of interconnection between said oppositely poled diodes.

(References on following page)

References Cited in the file of this patent

UNITED STATES PATENTS

| | | |
|---|---|---|
| 2,579,336 | Rack | Dec. 18, 1951 |
| 2,622,212 | Anderson | Dec. 16, 1952 |
| 2,862,171 | Freeborn | Nov. 25, 1958 |

OTHER REFERENCES

Electronics, engineering edition, May 9, 1958, vol. 31, No. 19, page 92.

Microalloy Transistor for Very High Switching Speeds by J. B. Angell and M. M. Fortini, Aug. 23, 1956, page 15.